United States Patent
Bhattacharyya et al.

(10) Patent No.: US 10,590,351 B2
(45) Date of Patent: Mar. 17, 2020

(54) PROCESS FOR USING MOLYBDENUM AND PARTICULATE CARBON CATALYST FOR SLURRY HYDROCRACKING

(71) Applicant: UOP LLC, Des Plaines, IL (US)

(72) Inventors: Alakananda Bhattacharyya, Glen Ellyn, IL (US); Phuong T. M. Do, Des Plaines, IL (US); Beckay J. Mezza, Arlington Heights, IL (US); Stephen C. Houdek, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/789,931

(22) Filed: Oct. 20, 2017

(65) Prior Publication Data

US 2018/0037826 A1 Feb. 8, 2018

Related U.S. Application Data

(63) Continuation of application No. PCT/US2016/054275, filed on Sep. 29, 2016.

(60) Provisional application No. 62/235,273, filed on Sep. 30, 2015.

(51) Int. Cl.
| | |
|---|---|
| *C10G 47/12* | (2006.01) |
| *B01J 23/28* | (2006.01) |
| *B01J 35/10* | (2006.01) |
| *C10G 47/26* | (2006.01) |
| *C10G 47/02* | (2006.01) |
| *B01J 21/18* | (2006.01) |
| *B01J 35/02* | (2006.01) |
| *B01J 37/02* | (2006.01) |

(52) U.S. Cl.
CPC .............. *C10G 47/12* (2013.01); *B01J 21/18* (2013.01); *B01J 23/28* (2013.01); *B01J 35/023* (2013.01); *B01J 35/1019* (2013.01); *B01J 35/1023* (2013.01); *B01J 35/1028* (2013.01); *B01J 35/1038* (2013.01); *B01J 35/1047* (2013.01); *B01J 35/1071* (2013.01); *B01J 37/0201* (2013.01); *B01J 37/0236* (2013.01); *C10G 47/02* (2013.01); *C10G 47/26* (2013.01)

(58) Field of Classification Search
CPC .................................................... C10G 47/12
See application file for complete search history.

(56) References Cited

U.S. PATENT DOCUMENTS

| | | | |
|---|---|---|---|
| 3,663,431 A * | 5/1972 | Wagner | B01J 27/04 208/143 |
| 4,313,852 A | 2/1982 | Gavin et al. | |
| 4,435,280 A | 3/1984 | Ranganathan | |
| 4,525,267 A * | 6/1985 | Inooka | B01J 23/94 208/110 |
| 4,969,988 A | 11/1990 | Jain et al. | |
| 5,755,955 A | 5/1998 | Benham et al. | |
| 5,928,501 A | 7/1999 | Sudhakar | |
| 6,797,153 B1 | 9/2004 | Fukuyama | |
| 8,123,933 B2 | 2/2012 | Bhattacharyya et al. | |
| 9,255,229 B2 | 2/2016 | Borremans | |
| 2002/0112987 A1 | 8/2002 | Hou | |
| 2011/0306490 A1 | 12/2011 | Bhattacharyya | |
| 2013/0075303 A1 * | 3/2013 | Heraud | B01J 23/883 208/50 |
| 2013/0284639 A1 | 10/2013 | Ryu | |

FOREIGN PATENT DOCUMENTS

CA 2426374 A1 11/2003

OTHER PUBLICATIONS

Search Report dated Dec. 29, 2016 for corresponding PCT Appl. No. PCT/US2016/054275.
U.S. Appl. No. 15/789,926, filed Oct. 20, 2017.
U.S. Appl. No. 15/796,697, filed Oct. 27, 2017.
U.S. Appl. No. 15/796,702, filed Oct. 27, 2017.
Smith, "The Combustion Rates of Coal Chars: A Review", "Ninenteenth Symposium", Apr. 5, 2019, pp. 1045-1065, vol. 1982, Publisher: The Combustion Institute, Published in: North Ryde, Australia.

* cited by examiner

*Primary Examiner* — Randy Boyer
(74) *Attorney, Agent, or Firm* — Paschall & Associates, LLC; James C. Paschall

(57) ABSTRACT

A process and catalyst is disclosed for converting heavy hydrocarbon feed into lighter hydrocarbon products using multifunctional catalysts. Multifunctional catalysts enable use of less expensive metal by substituting expensive metals for less expensive metals with no loss or superior performance in slurry hydrocracking. Less available and expensive ISM can be replaced effectively.

18 Claims, 1 Drawing Sheet

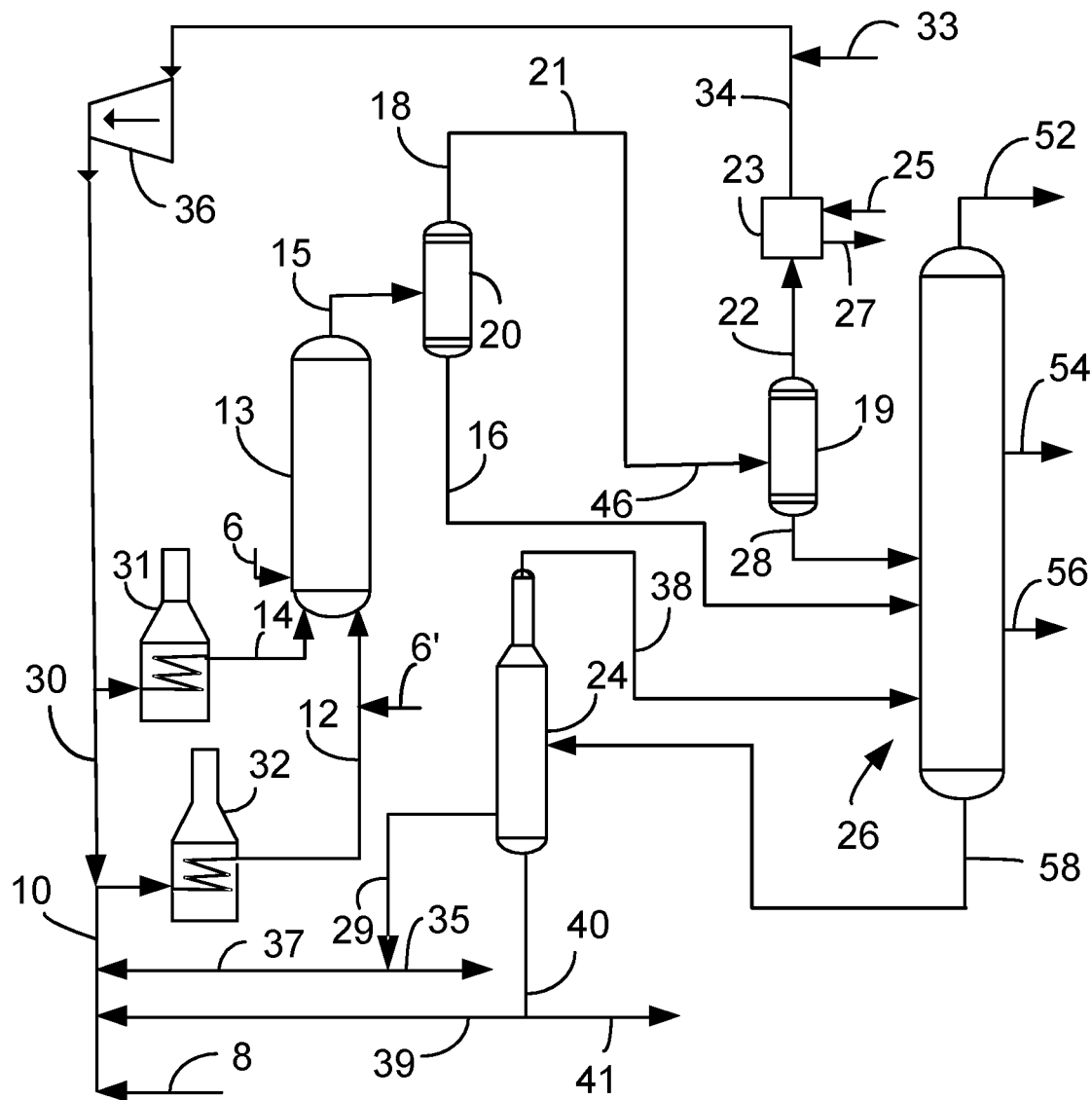

PROCESS FOR USING MOLYBDENUM AND PARTICULATE CARBON CATALYST FOR SLURRY HYDROCRACKING

CROSS-REFERENCE TO RELATED APPLICATIONS

This application is a Continuation of copending International Application No. PCT/US2016/054275 filed Sep. 29, 2016 which application claims benefit of U.S. Provisional Application No. 62/235,273 filed Sep. 30, 2015, the contents of which cited applications are hereby incorporated by reference in their entirety.

BACKGROUND

The field relates to a process and apparatus for the treatment of crude oils and, more particularly, to the hydroconversion of heavy hydrocarbons in the presence of additives and catalysts to provide useable products and further prepare feedstock for further refining.

As the reserves of conventional crude oils decline, heavy oils must be upgraded to meet world demands. In heavy oil upgrading, heavier materials are converted to lighter fractions and most of the sulfur, nitrogen and metals must be removed. Heavy oils contain a large portion of material boiling above 524° C. (or 975° F.) or higher. These heavy hydrocarbon feedstocks may be characterized by low reactivity in visbreaking, high coking tendency, poor susceptibility to hydrocracking and difficulties in distillation. Most residual oil feedstocks which are to be upgraded contain some level of asphaltenes which are typically understood to be heptane insoluble and toluene soluble compounds as determined by ASTM D3279 or ASTM D6560. Asphaltenes are high molecular weight compounds containing heteroatoms which impart polarity.

Heavy oils must be upgraded in a primary upgrading unit before it can be further processed into useable products. Primary upgrading units known in the art include, but are not restricted to, coking processes, such as delayed or fluidized coking, and hydrogen addition processes such as ebullated bed or slurry hydrocracking (SHC). As an example, the yield of liquid products, at room temperature, from the coking of some Canadian bitumens is typically about 55 to 60 wt % with substantial amounts of coke as by-product. On similar feeds, ebullated bed hydrocracking typically produces liquid yields of 50 to 55 wt %. Ebullated bed hydrocracking uses catalyst, typically extruded pellets, as big as 1 mm in size. U.S. Pat. No. 5,755,955 describes a SHC process which has been found to provide liquid yields of 75 to 80 wt % with much reduced coke formation through the use of additives.

In SHC, a three-phase mixture of heavy liquid oil feed cracks in the presence of gaseous hydrogen over solid catalyst to produce lighter products under pressure at an elevated temperature. Iron sulfate has been disclosed as an SHC catalyst, for example, in U.S. Pat. No. 5,755,955. Iron sulfate monohydrate (ISM) is typically ground down to smaller size for better dispersion and facilitation of mass transfer. Iron sulfate ($FeSO_4$) usually requires careful thermal treatment in air to remove water from hydrated iron sulfate which is typically provided in a mono or heptahydrated form. Water can inhibit conversion of $FeSO_4$ to iron sulfide and typically must be removed. Treatment with sulfur-containing compounds such as hydrogen sulfide converts the iron in iron sulfate to the catalytically active species, iron sulfide. The sulfur from iron sulfate contributes to the sulfur in the product that has to be removed. Other iron containing catalysts such as limonite, which contains FeO(OH).$nH_2O$, require presulfiding treatment for better dispersion and conversion of the iron oxide to the active iron sulfide according to CA 2,426,374. Presulfiding treatment adds sulfur to the catalyst and consequently to the heavy hydrocarbon being processed. As such, extra sulfur must usually be removed from the product. The active iron is in the +2 oxidation state in the iron sulfide catalyst which is required to obtain adequate conversion and selectivity to higher value products and to avoid excessive coke formation. ISM is expensive and may not be sufficiently available to catalyze all of the SHC units the world may need to upgrade heavy oil. Other minerals such as bauxite have been shown to be an excellent SHC catalyst for example in U.S. Pat. No. 8,123,933 B2.

During an SHC reaction, it is important to minimize coking. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate, or flocculate to form larger molecules, generating a mesophase particle or sphere and precipitating out of solution to ultimately form coke.

Toluene can be used as a solvent to dissolve and separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes which are insoluble in heptanes, but soluble in toluene. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in a SHC reactor and that coke formation is likely to occur under prevailing conditions.

Due to the anticipated demand for SHC operations to upgrade heavy oil, greater supplies of effective catalyst will become necessarily desirable.

SUMMARY

A process embodiment comprises a process for converting heavy hydrocarbon feed into lighter hydrocarbon products comprising mixing the heavy hydrocarbon liquid feed with catalyst and hydrogen to form a heavy hydrocarbon slurry comprising hydrocarbon liquid and catalyst particles. The catalyst comprises molybdenum and carbon particles comprising a pore volume of at least 0.2 cc/g, and a mean diameter of no more than 800 microns. The hydrocarbons are hydrocracked in the heavy hydrocarbon slurry in the presence of hydrogen and catalyst in a hydrocracking reactor to produce a hydrocracked slurry product comprising lighter hydrocarbon products. The hydrocracked slurry product is withdrawn from the hydrocracking reactor.

An additional process embodiment further comprises a process wherein a catalyst comprises molybdenum in a concentration of no more than about 200 wppm in the feed and carbon particles comprising a pore volume of at least 0.2 cc/g, and a mean diameter of no more than 800 microns.

A further process embodiment comprises a process wherein a catalyst comprises molybdenum in a concentration of no more than about 200 wppm in the feed and carbon particles comprising a pore volume of at least 0.2 cc/g, and a mean diameter of no more than 800 microns and no more than about 2 wt % of the feed.

BRIEF DESCRIPTION OF THE DRAWING

For a better understanding, reference is made to the accompanying drawing.

The FIGURE is a schematic flow scheme for a SHC plant.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel boiling range" means hydrocarbons boiling in the range of between about 204° C. (399° F.) and 343° C. (650° F.) using the TBP distillation method.

As used herein, the term "diesel conversion" means conversion of feed that boils above the diesel cut point to material that boils at or below the diesel cut point in the diesel boiling range.

As used herein, "pitch conversion" means the conversion of materials boiling above 524° C. (975° F.) converting to material boiling at or below 524° C. (975° F.).

As used herein, "vacuum gas oil" means the hydrocarbon material boiling in the range between about 343° C. (650° F.) and about 524° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

As used herein, the term "incipient wetness" means liquid is added to a measured amount of a dried material in drop-wise fashion until a paste is obtained and all of the pores of the solid are filled with no free flowing liquid. The volume of liquid water needed to reach incipient wetness per weight of solid is the aqueous pore volume.

The term "Cx" are to be understood to refer to molecules having the number of carbon atoms represented by the subscript "x". Similarly, the term "Cx−" refers to molecules that contain less than or equal to x and preferably x and less carbon atoms. The term "Cx+" refers to molecules with more than or equal to x and preferably x and more carbon atoms.

DESCRIPTION OF THE PREFERRED EMBODIMENTS

We have found bi-functional catalysts comprised of molybdenum and carbon particles from various sources can be equal or superior to ISM in terms of conversion to desirable products and limiting the formation of undesirable products or insolubles. The addition of carbon is effective in the control of mesophase formation, thus allowing the smooth operation in slurry hydrocracking. Carbon is also helpful in conversion of heavy hydrocarbon feed to below the pitch boiling point. Carbon is less expensive than molybdenum. Replacing molybdenum with carbon enhances the effectiveness of the catalyst while easing the need for molybdenum and reduces catalyst cost. Since carbon is effective in reducing mesophase, we can use a lower concentration of molybdenum in the feed. With carbon catalyst, the concentration of molybdenum catalyst can be much lower than the concentration of molybdenum alone and maintain the same or better performance.

The process of this invention is capable of processing a wide range of heavy hydrocarbon feedstocks. It can process aromatic feedstocks, as well as feedstocks which have traditionally been very difficult to hydroprocess, e.g. atmospheric or vacuum residue, visbroken residue, deasphalted bottom materials, off-specification asphalt, sediment from the bottom of oil storage tanks, tar sands, bitumen, etc. Suitable feeds include atmospheric residue with an IBP above or at about 650° F. (343° C.), heavy vacuum gas oil (VGO) with an IBP above or at about 800° F. (426° C.) and vacuum residue with an IBP above or at about 950° F. (510° C.). Feeds with a T90 greater than or equal to 572° F. (300° C.) will be suitable. Suitable feeds include an API gravity of no more than 20 degrees, typically no more than 10 degrees and may include feeds with less than 5 degrees.

In the exemplary SHC process as shown in the FIGURE, one, two or all of a heavy hydrocarbon oil feed in line 8, a recycle pitch stream containing catalyst particles in line 39, and recycled heavy VGO (HVGO) in line 37 may be combined in line 10. The combined feed in line 10 is heated in the heater 32 and pumped through an inlet line 12 into an inlet in the bottom of the tubular SHC reactor 13. Solid particulate and/or oil soluble catalyst material may be added directly to heavy hydrocarbon oil feed in the SHC reactor 13 from line 6 or may be mixed from line 6' with a heavy hydrocarbon oil feed in line 12 before entering the reactor 13 to form a slurry in the reactor 13. Several catalyst mixing lines 6, 6' may be used. It is not necessary and may be disadvantageous to add the catalyst upstream of the heater 32. It is possible that in the heater, metal particles may sinter or agglomerate to make larger metal particles, which is to be avoided. Many mixing and pumping arrangements may be suitable. It is also contemplated that feed streams may be added separately to the SHC reactor 13. Recycled hydrogen and make up hydrogen from line 30 are fed into the SHC reactor 13 through line 14 after undergoing heating in heater 31. The hydrogen in line 14 that is not premixed with feed may be added at a location above the feed entry in line 12. Both feed from line 12 and hydrogen in line 14 may be distributed in the SHC reactor 13 with an appropriate distributor. Additionally, hydrogen may be added to the feed in line 10 before it is heated in heater 32 and delivered to the SHC reactor in line 12. Preferably the recycled pitch stream in line 39 makes up in the range of about 5 to 15 wt % of the feedstock to the SHC reactor 13, while the HVGO in line 37 makes up in the range of 5 to 50 wt % of the feedstock, depending upon the quality of the feedstock and the once-through conversion level. The feed entering the SHC reactor 13 comprises three phases, solid catalyst particles, liquid and solid hydrocarbon feed and gaseous hydrogen and vaporized hydrocarbon.

The process can be operated at quite moderate pressure, in the range of 3.5 to 24 MPa (500 to 3500 psig) and preferably in the range of 10.3 to 17.2 MPa (1500 to 2500 psig), without coke formation in the SHC reactor 13 with the appropriate catalyst. The reactor temperature is typically in the range of about 400 to about 500° C. with a temperature of about 440 to about 465° C. being suitable and a range of 445 to 460° C. being preferred. The LHSV is typically below about 4 h$^{-1}$ on a fresh feed basis, with a range of about 0.1 to 3 h$^{-1}$ being preferred and a range of about 0.3 to 1 h$^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor 13 is above the inlet. Although only one is shown in the FIGURE, one or more SHC reactors 13 may be utilized in parallel or in series. Because the liquid feed is converted to vaporous product, foaming tends to occur in the SHC reactor 13. An antifoaming agent may also be added to the SHC reactor 13, preferably to the top thereof, to reduce the tendency to generate foam. Suitable antifoaming agents include silicones as disclosed in U.S. Pat. No. 4,969,988.

A gas-liquid mixture is withdrawn from the top of the SHC reactor 13 through line 15 and separated preferably in a hot, high-pressure separator 20 kept at a separation temperature between about 200 and 470° C. (392 and 878° F.) and preferably at about the pressure of the SHC reactor. In the hot separator 20, the effluent from the SHC reactor 13 is separated into a gaseous stream 18 and a liquid stream 16. The liquid stream 16 contains HVGO. The gaseous stream 18 comprises between about 35 and 80 vol-% of the hydrocarbon product from the SHC reactor 13 and is further processed to recover hydrocarbons and hydrogen for recycle.

A liquid portion of the product from the hot separator 20 may be further separated at lower temperature and/or stripped to provide a hot slurry hydrocracked liquid effluent in line 16 to the product fractionation column 26.

The gaseous stream in line 18 may be passed to a cold high pressure separator 19. Within the cool separator 19, the product is separated into a gaseous stream rich in hydrogen which is drawn off through the overhead in line 22 and a liquid hydrocarbon product which is drawn off the bottom through line 28. The hydrogen-rich stream 22 may be passed through a packed scrubbing tower 23 where it is scrubbed by means of a scrubbing liquid in line 25 to remove hydrogen sulfide and ammonia. The spent scrubbing liquid in line 27 may be regenerated and recycled and is usually an amine. The scrubbed hydrogen-rich stream emerges from the scrubber via line 34 and is combined with fresh make-up hydrogen added through line 33 and recycled through a recycle gas compressor 36 and line 30 back to reactor 13. The bottoms line 28 may carry cold liquid slurry hydrocracked product to a further low pressure flash drum and/or a stripper before feeding a cold slurry hydrocracked liquid effluent to the product fractionator 26.

The product fractionator 26 may comprise one or several vessels although it is shown only as one in the FIGURE. The product fractionator produces a $C_4^-$ recovered in overhead line 52, a naphtha product stream in line 54, a diesel stream in line 56 and a VGO/pitch stream in bottoms line 58.

The bottoms line 58 may carry the VGO/pitch stream in bottoms line 58 to a liquid vacuum fractionation column 24 maintained at a pressure between about 0.25 and 1.5 psi (1.7 and 10.0 kPa) and at a vacuum distillation temperature resulting in an atmospheric equivalent cut point between light VGO and heavy VGO of between about 250° and 500° C. (482° and 932° F.). Three fractions may be separated in the liquid fractionation column: an overhead fraction of light VGO in an overhead line 38 which may be further processed or recycled through line 38 back to the product fractionation column 26, a HVGO stream from a side cut in line 29 and a pitch stream obtained in a bottoms line 40 which typically boils above 450° C. At least a portion of this pitch stream may be recycled back in line 39 to form part of the feed slurry to the SHC reactor 13. Remaining catalyst particles from SHC reactor 13 will be present in the pitch stream and may be conveniently recycled back to the SHC reactor 13. Any remaining portion of the pitch stream is recovered in line 41.

During the SHC reaction, it is important to minimize coking. Adding a lower polarity aromatic oil to the feedstock reduces coke production. The polar aromatic material may come from a portion of the HVGO in line 29 recycled by line 37 to form part of the feed slurry to the SHC reactor 13. The remaining portion of the HVGO may be recovered in line 35.

The catalyst of the present invention comprises molybdenum and carbon particles. The molybdenum may be added as a liquid, and the carbon particles and the molybdenum may be separately added to the hydrocarbon feed. Additionally, the molybdenum may be impregnated on the carbon particles before being added to the hydrocarbon feed.

The molybdenum may be provided as an organic molybdenum such as molybdenum octoate or molybdenum dithiocarbamate which because it is oil or hydrocarbon soluble may be added directly to the hydrocarbon feed separately from or with the carbon particles. Organic molybdenum may be obtained from R. T. Vanderbilt Holding Company, Inc. of Norwalk, Conn. as molybdenum di-(2-ethylhexyl)-phosphorodithioate in oil under the trade name Molyvan L. Phosphomolybdates and ammonium heptamolybdate may be other suitable sources of molybdenum. The molybdenum may react with sulfur provided in the hydrocarbon feed or in an additive to produce molybdenum sulfide in the reactor which is the active form of the molybdenum catalyst.

Alternatively, organic molybdenum or an aqueous form of molybdenum may be impregnated onto the carbon particles. An aqueous molybdenum may be derived from reacting $MoO_3$ with an aqueous acid or basic solution such as phosphoric acid or ammonium hydroxide, respectively. Molybdenum in aqueous or oil-soluble liquid form in a volume selected to achieve target concentration may be dropped onto carbon particles.

Due to help from the carbon particles, the concentration of the molybdenum in the catalyst may be no more than about 500 wppm in the hydrocarbon feed, suitably no more than about 200 wppm in the hydrocarbon feed and typically no more than about 175 wppm in the feed. In some cases, the concentration of molybdenum may be no more than 100 wppm in the feed and preferably not more than 50 wppm of the feed due to help from other catalyst.

Carbon particles can be impregnated with an aqueous or oil based molybdenum solution. For example molybdenum trioxide ($MoO_3$) can be dissolved in ammonium hydroxide ($NH_4OH$) and added drop wise to the carbon particles to achieve incipient wetness. The molybdenum impregnated carbon particles may be ground and dried such as overnight drying at 140° C. in nitrogen. The impregnated carbon particles may be heated such as at 450° C. for three hours with 400 $scm^3$/min of nitrogen to provide molybdenum impregnated carbon particles for SHC catalyst.

We have found that carbon particles of small size can be an effective cocatalyst particle with molybdenum.

Smaller carbon particle size increases its activity in slurry hydrocracking and also helps to reduce abrasiveness of the particles on reactor and transport internals. The carbon particles have a mean diameter of no more than or at about 800 microns, typically no more than or at about 500 microns, suitably no more than or at about 150 microns, exemplarily no more than or at about 100 microns and preferably no more than or at about 60 microns. Suitable carbon particles may be petroleum cokes, coal cokes, pitch cokes, activated charcoal, charcoal, activated carbon and gas phase carbonized substances such as carbon blacks.

The carbon particles should have a larger pore size which makes it an effective adsorbent for macro molecules found in heavy oil and in mesophase. Fine powdered carbon has a larger open pore volume than granulated carbon. Suitable carbon particles may comprise open pore volume of as low as 0.12 cc/g, at least and at about 0.15 cc/g, suitably at least and about 0.18 cc/g and preferably at least and at about 0.2 cc/g. Carbon particles effective at adsorption are characterized as having a surface area of more than or at about 200 $m^2$/g and no more than or at about 1300 $m^2$/g determined by the BET methods in ASTM D4222 and D4641. The carbon particles may contain considerable proportions of mesopores and macropores but without an overabundance of micropores. Micropores comprising between about 30 to about 70 microns may comprise less than about and at 90% of the pore volume and may comprise more than about and at 30% of the pore volume. It is preferred that the carbon particles have a micropore volume of less than or at about 0.5 cc/g. It may also be preferred that the carbon particles have a micropore volume of greater than or at about 0.1 cc/g.

Suitable carbon particles include activated carbon particles which are a form of carbon processed to have higher surface area. The carbon may be sourced from nutshells, coconut husks, peat, wood, coir, coal or charcoal. The fresh carbon material may be dried by heating it to high temperature such as 600 to 900° C. in an inert atmosphere and subsequently or alternatively just activating it in an inert atmosphere at a temperature in the range of 600 to 1300° C. Suitable carbon particles include HOK Activated Lignite from Rheinbraun Brennstoff GmbH and C-Granular and CA-1 from Norit Americas Inc. located in Marshall, Tex.

The carbon particles may comprise at least about 0.3 wt %, perhaps 0.5 wt %, of the hydrocarbon feed, suitably at least about 0.75 wt % of the hydrocarbon feed and preferably at least about 0.9 wt % of the hydrocarbon feed. The carbon particles may comprise no more than about 5.0 wt % and suitably no more than about 2.0 wt % of the feed and perhaps preferably no greater than about 1.0 wt % of the feed, but greater carbon concentration may be advantageous to offset the need for molybdenum concentration in the feed.

The molybdenum and carbon catalysts can maintain TIOR yield as a percentage of feed under about 3 wt % and preferably below 2.5 wt % and maintain mesophase as a percentage of toluene insolubles (TI) under 1 wt % and preferably under 0.5 wt % using RPLM which allows an SHC reaction to proceed without it coking up and necessitating a shut down. Some difficult feeds will produce a higher TIOR yield but the catalyst will still maintain mesophase at sufficiently low yield to allow efficient operation.

EXAMPLES

Example 1

An Urals vacuum resid having a characterization in Table 1 was used to test the catalyst.

TABLE 1

| | |
|---|---|
| Density, g/cm³ | 1.013 |
| Sulfur, wt % | 2.89 |
| Carbon, wt % | 83.1 |
| Hydrogen, wt % | 10.2 |
| Nitrogen, wt % | 0.34 |
| Heptane Insolubles, wt % | 5.78 |
| Carbon Residue, wt % | 17.9 |
| Pentane Insolubles, wt % | 10 |
| Toluene Insolubles, wt % | 0.4 |

Carbon particles in the experiments had characterizations in Table 2 using the BET adsorption method. ASTM D4222 and D4641 are acceptable methods for determining BET adsorption. Particle size distribution may be determined by ASTM D4464.

TABLE 2

| Carbon notation | Fine HOK lignite | Granular HOK lignite | Illinois coal #6 | C-Granular | CA-1 | Beulah lignite | Fengtai lignite |
|---|---|---|---|---|---|---|---|
| Nitrogen Adsorption | | | | | | | |
| BET Surface Area (m$^2$/g) | 246 | 233 | 219 | 1177 | 1260 | 275 | 59 |
| BET Pore Volume (cc/g) | 0.204 | 0.18 | 0.125 | 0.97 | 1.087 | 0.157 | 0.045 |
| BET Pore Diameter (A) | 33 | 31 | 23 | 33 | 35 | 23 | 31 |
| BET Micropore Area (m$^2$/g) | 177 | 175 | 214 | 783 | 812 | 267 | 59 |
| BET Micropore Volume (cc/g) | 0.094 | 0.093 | 0.11 | 0.407 | 0.420 | 0.138 | 0.032 |
| Micropore Volume Proportion, % | 46 | 52 | 88 | 42 | 39 | 88 | 71 |
| Particle Size Distribution | | | | | | | |
| Median Diameter (microns) | 13.6 | 367 | 32 | 52.7 | 39.6 | 20.2 | 12.1 |
| Mean Diameter (microns) | 19.2 | 368 | 36.1 | 56.6 | 46.2 | 42.5 | 12.9 |
| 10 | 2.14 | 303 | 9.38 | 17.6 | 11.4 | 4.58 | 3.4 |
| 25 | 5.11 | 331 | 17.2 | 30.8 | 21.3 | 8.85 | 6.6 |
| 50 | 13.6 | 367 | 32 | 52.7 | 39.6 | 20.2 | 12.1 |
| 75 | 25.4 | 403 | 48 | 75.6 | 62.9 | 39.7 | 17.9 |
| 90 | 39.3 | 441 | 66.4 | 100 | 89.8 | 92.4 | 23.4 |

The fine HOK lignite and granular HOK lignite were activated lignites from Rheinbraun Brennstoff. Beulah lignite was from the Beulah mine in North Dakota. Fengtai lignite was from China. Beulah lignite, Fengtai lignite and Illinois bituminous coal no. 6 were activated at 750° C. in nitrogen for 1 hour. The C-Granular and CA-1 were purchased from Norit Americas Inc. located in Marshall, Tex.

Testing was conducted to examine activity of the catalysts. The reactors used to rank catalysts in the heavy oil research activity were batch autoclaves. Five hundred grams of Urals vacuum residues were charged to the autoclave. The catalyst mixture and sulfur additive, if used, were then charged to the autoclave reactor and mixing was started at 300 rpm. Hydrogen was brought online to the reactor. Mixer speed was then increased to 1000 rpm, the band heater temperature set point was raised to 450° C., and the reactor pressure was brought to the operating pressure. Flow was commenced at 6.5 sl/min. of hydrogen. The experiment was considered to have begun once liquid temperature reached 450° C. The experiment was held at temperature and pressure with mixing for either 80, 100 or 120 minutes. The experiment was terminated by turning off all heaters, reducing mixing rate to 300 rpm, and bringing cooling water online into the reactor jacket. The plant was cooled from 450° C. to 100° C. in 15 minutes and then was de-pressured. Plant was then re-pressured to 1.4 MPa (gauge) (200 psig) with nitrogen and the knock-out pots were emptied with the aid of the plant pressure. Plant was again de-pressured and reactor contents were unloaded.

Reactor material was diluted with toluene and filtered through 7-10 um paper in a Buchner funnel. Filtered solid was washed until filtrate was transparent, but not colorless. Filtrates were combined and concentrated under vacuum on a rotary evaporator at 45° C. until nearly solvent free. Temperature was then raised to 75° C. for 1 hour after which the material was weighed and sent for analytical testing. The liquid product material was then weighed and sent for analytical testing. The knock-out pot material was isolated from any entrained water and both weights were recorded. The knock-out pot organic component was then sent for analytical testing.

The toluene-insoluble (TI) solids remaining on the filter paper were then dried in the vacuum oven at 100° C. for 24 hours prior to Soxhlet extraction at 110° C. for 6 hours in toluene solvent to remove additional toluene-soluble organic material. The Soxhlet extracted TI solids were dried in the vacuum oven at 100° C. for 24 hours and then subjected to mesophase analysis via RPLM.

RPLM is the technique used to quantify the mesophase size and amount in the TI solids generated after the heavy oil reactions using ASTM D4616-95. Due to the interference of mesophase patterns and microtexture with accurate measurements in the method, rotating the incident light beam was employed to provide accurate shape and sizes following the teachings of J. Crelling, "Bireflectance Imaging of Coal and Carbon Specimens", INT'L J. COAL GEOLOGY, vol. 64, Issues 3-4, 204-216 (2005). A fully automated bi-reflectance method acquires 183 images randomly on mounted and polished TI samples. The image processing software then generates the mesophase volume-adjusted diameter and concentration, or total bright percent average, from the 183 images. RPLM was performed with 8× and 25× lenses.

The Urals vacuum resid feed in Table 1 was reacted over 1 wt % HOK fine lignite carbon particles of Table 2 mixed with oil soluble molybdenum commercially available as Molyvan L at 450° C. and 13.8 MPa (gauge) (2000 psig). TIOR concentration at various molybdenum feed concentrations is given in Table 3.

TABLE 3

| Molybdenum concentration, wppm | TIOR, wt % | |
|---|---|---|
| | Without Carbon | With Carbon |
| 50 | 10.6 | 2.6 |
| 75 | 7.0 | 2.6 |
| 100 | 3.7 | 2.5 |
| 150 | 2.1 | 2.3 |

Table 3 reveals that the carbon particles suppressed TIOR production at lower molybdenum concentrations.

Example 2

Norit C Granular activated carbon particles required grinding to ensure the correct mesh size could be obtained. The ground carbon was sized to greater than 200 mesh or 74 microns or less and placed on a ceramic dish for drying.

Drying was accomplished in an oven at 150° C. for 2 hours in nitrogen. Some of the pretreated activated carbon was then impregnated with molybdenum.

To impregnate the carbon particles, dried Norit CA-1 particles, a solution of molybdenum trioxide ($MoO_3$) and ammonium hydroxide ($NH_4OH$) was prepared with continuous stirring until the molybdenum trioxide was completely dissolved. Proportions were chosen to obtain 1 wt % carbon in the feed. For example 1.82 g molybdenum trioxide and 218 g of 14.8 N ammonium hydroxide solution were used. The solution was added drop wise to the carbon particles while mixing them with a spatula in a mortar. Sufficient solution is dropped on the carbon such that the carbon had the appearance of incipient wetness. For example 120 g of Norit CA-1 particles were used. The molybdenum impregnated carbon particles were then ground with a pestle and left in the hood for a couple of hours to dry. An oven was used for overnight drying at 140° C. in nitrogen. To calcine the impregnated particles, a quartz furnace tube was packed, from bottom to top, with alumina spheres, quartz wool, a piece of inert cloth, a combination of glass beads and the impregnated particles, quartz wool, and quartz helices. The packed quartz furnace tube was placed in the furnace and calcined at 450° C., with a ramp rate of 0.5° C. per min, for three hours with 400 $scm^3$/min. of nitrogen. Once the calcination was complete and the quartz tube unpacked, the impregnated particles and the glass beads were sieved to separate the two from each other.

The Urals feed of Table 1 was reacted at 450° C. and 13.8 MPa (gauge) (2000 psig) for 80 minutes with molybdenum concentration of 150 ppm by weight of the feed with and without different carbon particle types at 1 wt % concentration to produce the results in Table 4. Molyvan L was added to the feed separately from the carbon particles. Mesophase was determined as a percentage of TI using RPLM.

TABLE 4

| Carbon | none | none | Norit CA-1 | Illinois Bituminous coal #6 | Beulah lignite | Norit C Granular | Norit CA-1 impregnated |
|---|---|---|---|---|---|---|---|
| Molybdenum concentration, wppm | 150 | 500 | 150 | 150 | 150 | 150 | 150 |
| Plant-Run | 522-630 | 523-612 | 522-659 | 522-670 | 523-638 | 522-665 | 523-615 |
| Conversion, wt % pitch + TIOR | 85.0 | 84.4 | 82.7 | 81.7 | 84.9 | 84.3 | 83.1 |
| $H_2S$, CO, $CO_2$, wt % | 2.5 | 3.6 | 3.5 | 2.9 | 2.7 | 3.0 | 2.4 |
| $C_1$-$C_4$ total, wt % | 7.1 | 6.1 | 6.8 | 7.6 | 6.0 | 7.4 | 6.7 |
| Naphtha ($C_5$-204° C.) yield, wt % feed | 24.3 | 23.8 | 24.0 | 26.6 | 24.0 | 23.7 | 25.5 |
| Diesel (204-343° C.) yield, wt % feed | 27.5 | 28.6 | 27.5 | 24.9 | 28.5 | 26.5 | 27.2 |
| VGO (343-524° C.) yield, wt % feed | 24.6 | 26.2 | 24.9 | 18.3 | 24.8 | 23.7 | 18.9 |
| Pitch (524° C.+) yield, wt % feed | 15.0 | 15.6 | 17.3 | 18.3 | 15.1 | 15.7 | 16.9 |
| TIOR based on ash, wt % feed | 2.01 | 1.55 | 1.80 | 2.35 | 1.74 | 1.96 | 4.14 |
| Mesophase in TI, wt % | 12.1 | 4.4 | 2.8 | 1.8 | 2 | 0.9 | 4.7 |
| Mesophase yield, wt % feed | 0.25 | 0.08 | 0.08 | 0.07 | 0.06 | 0.03 | 0.26 |

Mesophase was reduced with the addition of carbon and with molybdenum impregnated on carbon. It was observed that the carbon particles reduced the need for molybdenum to suppress mesophase production.

Example 3

The experiment of Example 2 was conducted with 100 wppm of molybdenum in the hydrocarbon feed with and without 1% of the carbon particles comprising HOK lignite at 450° C. and 13.8 MPa (gauge) (2000 psig). Mesophase was determined as a percentage of TI using RPLM as shown in Table 5.

TABLE 5

| Catalyst | 100 wppm Mo | 100 wppm Mo with 1% HOK lignite | |
|---|---|---|---|
| Plant-Run | 523-666 | 522-698 | 523-673 |
| Conversion, wt % pitch | 84.7 | 84.3 | 86.4 |
| $H_2S$, CO, $CO_2$ yield, wt % feed | 2.0 | 2.9 | 2.0 |
| $C_1$-$C_4$ total, wt % | 5.6 | 4.8 | 3.4 |
| Naphtha ($C_5$-204° C.) yield, wt % feed | 27.5 | 28.2 | 26.5 |
| Diesel (204 C.-343° C.) yield, wt % feed | 31.4 | 29.3 | 32.0 |
| VGO (343 C.-524° C.) yield, wt % feed | 18.2 | 19.1 | 22.4 |
| Pitch (524° C.+) yield, wt % feed | 15.3 | 15.7 | 13.6 |
| TIOR based on ash, wt % feed | 3.6 | 3.4 | 2.4 |
| Mesophase in TI, % | | 0.35 | 0.58 |
| Mesophase yield, wt % feed | | 0.02 | 0.02 |

TIOR was reduced when carbon was used with the molybdenum catalyst. Mesophase was kept at manageable SHC levels and would be expected to be less when carbon was used than when carbon was not used at the same concentration of molybdenum.

Example 4

Granular HOK lignite was compared to fine HOK lignite with molybdenum. The granular lignite had a mean particle diameter of over 100 microns. Pressure was 13.8 MPa (gauge) (2000 psig), and temperature was 450° C. Molybdenum concentration in the feed was 75 wppm. Time on stream was 120 minutes. Comparative results are shown in Table 6.

TABLE 6

|  | Fine powder of HOK lignite | Granular HOK lignite |
|---|---|---|
| Plant | 522-762 | 522-793 |
| Carbon concentration, wt % | 1 | 1.5 |
| Conversion, wt % pitch | 85 | 82.6 |
| $H_2S$, CO, $CO_2$ yield, wt % feed | 2.1 | 2.4 |
| $C_1$-$C_4$ total yield, wt % feed | 5.7 | 6.3 |
| Naphtha ($C_5$-204° C.) yield, wt % feed | 27.7 | 29.5 |
| Diesel (204 C.-343° C.) yield, wt % feed | 30.5 | 28.4 |
| VGO (343 C.-524° C.) yield, wt % feed | 18.9 | 16.1 |
| Pitch (524° C.+) yield, wt % feed | 15.0 | 17.4 |
| TIOR based on ash, wt % feed | 3.0 | 5.7 |

Fine HOK lignite in the feed at a lower concentration than the granular lignite was more effective in suppressing production of TIOR. Smaller carbon particles are more effective than larger particles.

Example 5

Oil soluble molybdenum precursor Molyvan L at 65 wppm with 2 wt % HOK fine lignite was reacted at 450° C., 16.2 MPa (gauge) (2350 psig) and 120 minutes. Each catalyst was added to the feed separately. Results are shown in Table 7.

TABLE 7

|  | Molyvan L |
|---|---|
| Plant-Run | 522-706 |
| Conversion, wt % pitch | 87.7 |
| $H_2S$, CO, $CO_2$, wt % | 2.4 |
| $C_1$-$C_4$ total, wt % | 4.4 |
| Naphtha ($C_5$-204° C.) yield, wt % feed | 28.0 |
| Diesel (204 C.-343° C.) yield, wt % feed | 31.3 |
| VGO (343 C.-524° C.) yield, wt % feed | 21.9 |
| Pitch (524° C.+) yield, wt % feed | 12.2 |
| TIOR based on ash, wt % feed | 2.3 |
| Mesophase in TI, wt % | 0.4 |
| Mesophase yield, wt % feed | 0.02 |

Specific Embodiments

While the following is described in conjunction with specific embodiments, it will be understood that this description is intended to illustrate and not limit the scope of the preceding description and the appended claims.

A first embodiment of the invention is a process for converting heavy hydrocarbon feed into lighter hydrocarbon products comprising mixing the heavy hydrocarbon liquid feed with catalyst and hydrogen to form a heavy hydrocarbon slurry comprising hydrocarbon liquid and catalyst particles, the catalyst comprising molybdenum and carbon particles comprising pore volume of at least 0.2 cc/g, and a mean diameter of no more than 800 microns; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the first embodiment in this paragraph wherein the molybdenum is impregnated on the carbon particles. An embodiment is one, any or all of prior embodiments in this paragraph up through the first embodiment in this paragraph wherein the molybdenum is provided as molybdenum sulfide in the hydrocracking reactor. An embodiment is one, any or all of prior embodiments in this paragraph up through the first embodiment in this paragraph wherein the molybdenum in the catalyst is no more than about 200 wppm in the feed. An embodiment is one, any or all of prior embodiments in this paragraph up through the first embodiment in this paragraph wherein the carbon particles have a mean diameter of no more than 150 microns. An embodiment is one, any or all of prior embodiments in this paragraph up through the first embodiment in this paragraph wherein the micropore volume of the carbon particles is less than 0.5 cc/g. An embodiment is one, any or all of prior embodiments in this paragraph up through the first embodiment in this paragraph wherein the BET surface area of the carbon particles is at least 200 $m^2$/g. An embodiment is one, any or all of prior embodiments in this paragraph up through the first embodiment in this paragraph wherein the carbon particles comprise no more than 2 wt % in the feed. An embodiment is one, any or all of prior embodiments in this paragraph up through the first embodiment in this paragraph wherein the molybdenum is no more than about 175 wppm in the feed. An embodiment is one, any or all of prior embodiments in this paragraph up through the first embodiment in this paragraph wherein the yield of TIOR in the product is no more than about 3.0 wt % of the feed. An embodiment is one, any or all of prior embodiments in this paragraph up through the first embodiment in this paragraph wherein the yield of mesophase in the product is no more than about 0.5 wt % of the feed based on rotational polarized light microscopy. An embodiment is one, any or all of prior embodiments in this paragraph up through the first embodiment in this paragraph wherein the molybdenum is provided by molybdenum octanoate, molybdenum dithiocarbamate, organic molybdenum, phosphomolybdates, ammonium heptamolybdate, $MoO_3$ or molybdenum sulfide and mixtures thereof.

A second embodiment is a process for converting heavy hydrocarbon feed into lighter hydrocarbon products comprising mixing the heavy hydrocarbon liquid feed with catalyst and hydrogen to form a heavy hydrocarbon slurry comprising hydrocarbon liquid and catalyst particles, the catalyst comprising molybdenum in a concentration of no more than about 200 wppm in the feed and carbon particles comprising pore volume of at least 0.2 cc/g, and a mean diameter of no more than 800 microns; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the second embodiment in this paragraph wherein the molybdenum is impregnated on the carbon particles. An embodiment is one, any or all of prior embodiments in this paragraph up through the second embodiment in this paragraph wherein the molybdenum in the catalyst is no more than about 175 wppm in the feed. An embodiment is one, any or all of prior embodiments in this paragraph up through the second embodiment in this paragraph wherein the carbon particles have a mean diameter of no more than 100 microns. An embodiment is one, any or all of prior embodiments in this paragraph up through the second embodiment in this paragraph wherein the BET surface area of the carbon particles is at least 200 m²/g.

A third embodiment is a process for converting heavy hydrocarbon feed into lighter hydrocarbon products comprising mixing the heavy hydrocarbon liquid feed with catalyst and hydrogen to form a heavy hydrocarbon slurry comprising hydrocarbon liquid and catalyst particles, the catalyst comprising molybdenum in a concentration of no more than about 200 wppm in the feed and carbon particles comprising pore volume of at least 0.2 cc/g, and a mean diameter of no more than 800 microns and no more than about 2 wt % of the feed; hydrocracking hydrocarbons in the heavy hydrocarbon slurry in the presence of hydrogen and catalyst in a hydrocracking reactor to produce a hydrocracked slurry product comprising lighter hydrocarbon products; and withdrawing the hydrocracked slurry product from the hydrocracking reactor. An embodiment is one, any or all of prior embodiments in this paragraph up through the third embodiment in this paragraph wherein the carbon particles comprise no more than 1 wt % in the feed. An embodiment is one, any or all of prior embodiments in this paragraph up through the third embodiment in this paragraph wherein the molybdenum in the catalyst is no more than about 175 wppm in the feed.

Without further elaboration, it is believed that using the preceding description that one skilled in the art can utilize the present invention to its fullest extent and easily ascertain the essential characteristics of this invention, without departing from the spirit and scope thereof, to make various changes and modifications and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting heavy hydrocarbon feed into lighter hydrocarbon products comprising:
    mixing said heavy hydrocarbon feed with catalyst and hydrogen to form a heavy hydrocarbon slurry comprising hydrocarbon liquid and catalyst particles, said catalyst comprising oil-soluble molybdenum and carbon particles comprising pore volume of at least 0.2 cc/g, and a mean diameter of no more than 800 microns, wherein said oil-soluble molybdenum and said carbon particles are added separately to said heavy hydrocarbon liquid feed;
    hydrocracking hydrocarbons in said heavy hydrocarbon slurry in the presence of hydrogen and catalyst in a hydrocracking reactor to produce a hydrocracked slurry product comprising lighter hydrocarbon products; and
    withdrawing said hydrocracked slurry product from said hydrocracking reactor.

2. The process of claim 1 wherein the molybdenum is provided as molybdenum sulfide in the hydrocracking reactor.

3. The process of claim 1 wherein the molybdenum in the catalyst is no more than about 200 wppm in the feed.

4. The process of claim 1 wherein the carbon particles have a mean diameter of no more than 150 microns.

5. The process of claim 1 wherein the micropore volume of the carbon particles is less than 0.5 cc/g.

6. The process of claim 1 wherein the BET surface area of the carbon particles is at least 200 m²/g.

7. The process of claim 1 wherein the carbon particles comprise no more than 2 wt % in the feed.

8. The process of claim 1 wherein the molybdenum is no more than about 175 wppm in the feed.

9. The process of claim 1 wherein the yield of TIOR in the product is no more than about 3.0 wt % of the feed.

10. The process of claim 1 wherein the yield of mesophase in the product is no more than about 0.5 wt % of the feed based on rotational polarized light microscopy.

11. The process of claim 1 wherein the molybdenum is provided by molybdenum octanoate, molybdenum dithiocarbamate, organic molybdenum, phosphomolybdates, ammonium heptamolybdate, $MoO_3$ or molybdenum sulfide and mixtures thereof.

12. A process for converting heavy hydrocarbon feed into lighter hydrocarbon products comprising:
    mixing said heavy hydrocarbon feed with catalyst and hydrogen to form a heavy hydrocarbon slurry comprising hydrocarbon liquid and catalyst particles, said catalyst comprising molybdenum in a concentration of no more than about 200 wppm in the feed and carbon particles comprising pore volume of at least 0.2 cc/g, and a mean diameter of no more than 800 microns, wherein said oil-soluble molybdenum and said carbon particles are added separately to said heavy hydrocarbon liquid feed;
    hydrocracking hydrocarbons in said heavy hydrocarbon slurry in the presence of hydrogen and catalyst in a hydrocracking reactor to produce a hydrocracked slurry product comprising lighter hydrocarbon products; and
    withdrawing said hydrocracked slurry product from said hydrocracking reactor.

13. The process of claim 12 wherein the molybdenum in the catalyst is no more than about 175 wppm in the feed.

14. The process of claim 12 wherein the carbon particles have a mean diameter of no more than 100 microns.

15. The process of claim 12 wherein the BET surface area of the carbon particles is at least 200 m²/g.

16. A process for converting heavy hydrocarbon feed into lighter hydrocarbon products comprising:
    mixing said heavy hydrocarbon feed with catalyst and hydrogen to form a heavy hydrocarbon slurry comprising hydrocarbon liquid and catalyst particles, said catalyst comprising molybdenum in a concentration of no more than about 200 wppm in the feed and carbon particles comprising pore volume of at least 0.2 cc/g, and a mean diameter of no more than 800 microns and no more than about 2 wt % of the feed, wherein said oil-soluble molybdenum and said carbon particles are added separately to said heavy hydrocarbon liquid feed;
    hydrocracking hydrocarbons in said heavy hydrocarbon slurry in the presence of hydrogen and catalyst in a hydrocracking reactor to produce a hydrocracked slurry product comprising lighter hydrocarbon products; and
    withdrawing said hydrocracked slurry product from said hydrocracking reactor.

17. The process of claim 16 wherein the carbon particles comprise no more than 1 wt % in the feed.

18. The process of claim 16 wherein the molybdenum in the catalyst is no more than about 175 wppm in the feed.

* * * * *